United States Patent
Nohno

(10) Patent No.: US 11,976,988 B2
(45) Date of Patent: May 7, 2024

(54) FORCE DETECTOR AND FORCE DETECTION SYSTEM WITH LAYERED STRUCTURE AND STRESS GENERATOR

(71) Applicant: Yokogawa Electric Corporation, Tokyo (JP)

(72) Inventor: Tomohito Nohno, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/557,550

(22) Filed: Dec. 21, 2021

(65) Prior Publication Data

US 2022/0205853 A1 Jun. 30, 2022

(30) Foreign Application Priority Data

Dec. 24, 2020 (JP) .................... 2020-214413

(51) Int. Cl.
*G01L 1/18* (2006.01)
(52) U.S. Cl.
CPC ...................... *G01L 1/18* (2013.01)
(58) Field of Classification Search
CPC ................ G01L 1/205; G01L 5/228
See application file for complete search history.

(56) References Cited

U.S. PATENT DOCUMENTS

| | | | | |
|---|---|---|---|---|
| 6,373,265 B1* | 4/2002 | Morimoto | ............ | H01H 25/041 |
| | | | | 324/661 |
| 6,637,276 B2* | 10/2003 | Adderton | ............ | G01L 5/1627 |
| | | | | 73/862.41 |
| 7,391,411 B2* | 6/2008 | Morimoto | ............ | G06F 3/0338 |
| | | | | 345/161 |
| 7,509,884 B2* | 3/2009 | Morimoto | ............ | G01L 1/205 |
| | | | | 73/862.628 |
| 7,784,362 B2* | 8/2010 | Shimojo | ............ | G01L 5/228 |
| | | | | 73/862.041 |

(Continued)

FOREIGN PATENT DOCUMENTS

EP 2490004 A1 8/2012
JP 2007010383 A 1/2007

(Continued)

OTHER PUBLICATIONS

Office Action issued in corresponding European Patent Application No. 21216678.9, dated Mar. 5, 2024 (7 pages).

*Primary Examiner* — Tran M. Tran
(74) *Attorney, Agent, or Firm* — Osha Bergman Watanabe & Burton LLP

(57) ABSTRACT

A force detector includes a layered structure including a first layer and a second layer. The first layer includes a detection face that receives a force to be detected and the second layer is disposed on a face opposite to the detection face. A Young's modulus of the first layer is different from a Young's modulus of the second layer. The force detector further includes a stress generator formed in the layered structure and that receives the force acting in a tangential direction of the detection face and generates a stress with a distribution that is asymmetric with respect to a normal direction of the detection face around the stress generator. The force detector further includes a plurality of sensors disposed around the stress generator.

14 Claims, 9 Drawing Sheets

(56) References Cited

U.S. PATENT DOCUMENTS

| | | | |
|---|---|---|---|
| 8,336,399 B2* | 12/2012 | Muroyama | G01L 5/228 |
| | | | 73/862.046 |
| 8,393,229 B2* | 3/2013 | Tao | G06F 3/045 |
| | | | 73/862.632 |
| 8,573,069 B2* | 11/2013 | Nishiwaki | B25J 13/083 |
| 8,613,231 B2* | 12/2013 | Muroyama | G01L 5/228 |
| | | | 73/862 |
| 8,695,441 B2* | 4/2014 | Kim | G01L 1/2293 |
| | | | 73/862.045 |
| 8,800,385 B2* | 8/2014 | Ikebe | G01L 5/161 |
| | | | 73/862.041 |
| 8,823,114 B2* | 9/2014 | Tanaka | G01L 1/146 |
| | | | 257/415 |
| 8,826,748 B2* | 9/2014 | Nakamura | G01L 5/228 |
| | | | 73/862.471 |
| 9,097,597 B2* | 8/2015 | Ikebe | B25J 13/085 |
| 9,158,369 B2* | 10/2015 | Grau | G06F 3/045 |
| 9,182,302 B2* | 11/2015 | Lim | G01L 1/18 |
| 9,205,561 B2* | 12/2015 | Ikebe | G01L 5/009 |
| 9,441,941 B2* | 9/2016 | Hwang | G01L 1/205 |
| 9,671,297 B2* | 6/2017 | Sibbett | G06F 3/045 |
| 9,851,266 B2* | 12/2017 | Nakamura | G01L 5/228 |
| 9,851,271 B2* | 12/2017 | Koo | B25J 13/084 |
| 9,904,395 B2* | 2/2018 | Ogura | G01L 1/144 |
| 10,078,027 B2* | 9/2018 | Masuda | G01L 9/0073 |
| 10,488,284 B2* | 11/2019 | Jentoft | G01L 1/02 |
| 10,521,007 B2* | 12/2019 | Grau | G06F 3/04144 |
| 10,727,832 B2* | 7/2020 | Boese | H03K 17/962 |
| 10,814,493 B2* | 10/2020 | Duchaine | G01L 9/0051 |
| 10,866,203 B2* | 12/2020 | Kobayashi | G01N 27/12 |
| 10,901,545 B2* | 1/2021 | Perlin | G06F 3/005 |
| 10,912,198 B2* | 2/2021 | Kraemer | H01G 5/145 |
| 11,025,251 B2* | 6/2021 | Kraemer | H03K 17/964 |
| 11,137,297 B2* | 10/2021 | Sawada | G01L 1/146 |
| 11,216,103 B2* | 1/2022 | Zhang | G02F 1/133602 |
| 11,249,589 B2* | 2/2022 | Perlin | G06F 3/04166 |
| 11,301,083 B2* | 4/2022 | Perlin | G06F 3/04166 |
| 11,346,727 B2* | 5/2022 | Hotta | G01L 1/148 |
| 11,460,364 B1* | 10/2022 | Chen | G01L 9/0036 |
| 11,524,414 B2* | 12/2022 | Nakayama | G01L 1/148 |
| 11,733,114 B2* | 8/2023 | Mori | B60C 23/064 |
| | | | 73/862.041 |
| 11,796,304 B2* | 10/2023 | Jin | G01B 7/16 |
| 2002/0092364 A1 | 7/2002 | Adderton et al. | |
| 2009/0320611 A1* | 12/2009 | Vasarhelyi | B25J 13/084 |
| | | | 428/179 |
| 2011/0083517 A1 | 4/2011 | Muroyama et al. | |
| 2012/0087545 A1 | 4/2012 | Perlin et al. | |
| 2013/0047747 A1* | 2/2013 | Joung | G01L 1/146 |
| | | | 73/862.68 |
| 2016/0283007 A1 | 9/2016 | Ogura et al. | |
| 2017/0199090 A1 | 7/2017 | Anan et al. | |
| 2018/0117772 A1* | 5/2018 | Ikebe | G01L 1/2287 |
| 2021/0123824 A1* | 4/2021 | Taki | G01L 5/226 |
| 2022/0034728 A1* | 2/2022 | Katsuhara | G01L 5/165 |
| 2022/0163414 A1* | 5/2022 | Aihara | G01L 1/146 |
| 2022/0390305 A1* | 12/2022 | Ishizaki | G01L 5/162 |
| 2023/0009475 A1* | 1/2023 | Sakakura | G06F 3/00 |

FOREIGN PATENT DOCUMENTS

| | | |
|---|---|---|
| JP | 2008-128940 A | 6/2008 |
| JP | 2011-85435 A | 4/2011 |
| JP | 2015087290 A | 5/2015 |
| WO | 02/44655 A1 | 6/2002 |

* cited by examiner

FORCE DETECTOR AND FORCE DETECTION SYSTEM WITH LAYERED STRUCTURE AND STRESS GENERATOR

BACKGROUND

Technical Field

The present invention relates to a force detector and a force detection system.

Priority is claimed on Japanese Patent Application No. 2020-214413, filed on Dec. 24, 2020, the contents of which are incorporated herein by reference.

Related Art

Recently, force detectors that detect a force applied from the outside of a tactile sensor or the like have been used. For example, Japanese Unexamined Patent Application Publication No. 2008-128940 discloses a tactile sensor including a pressure-sensitive conductive member, a pressure transmission member that presses the pressure-sensitive conductive member, and an elastic coating layer with which the pressure transmission member is coated. In such a tactile sensor disclosed in Japanese Unexamined Patent Application Publication No. 2008-128940, the pressure transmission member coated with the elastic coating layer is inclined by a force applied to the surface of the elastic coating layer and the force applied from the outside is detected by detecting a pressure on the pressure-sensitive conductive member which varies according to the inclination.

Since the tactile sensor disclosed in Japanese Unexamined Patent Application Publication No. 2008-128940 has a structure for detecting a force according to the inclination of the pressure transmission member due to the pressure-sensitive conductive member being pressed, a difference in stiffness between the elastic coating layer and the pressure transmission member needs to be very large in order to enhance the sensitivity of the pressure transmission member. However, there is a likelihood that the elastic coating layer and the pressure transmission member will be separated from each other at an interface therebetween due to long-term use of the tactile sensor, which may cause a decrease in detection accuracy. Since a Young's modulus of the pressure transmission member is large, it is difficult for the tactile sensor to bend as a whole and to deploy the tactile sensor on a curved surface or a shape-variable surface.

SUMMARY

A force detector may include: a layered structure including a first layer and a second layer, the first layer having a detection face on which a force to be detected acts, the second layer being provided on a face of the first layer opposite to the detection face and formed of a material that is different in a Young's modulus from the first layer; a stress generator formed in the layered structure and configured to receive the force acting in a tangential direction of the detection face and to generate a stress with a distribution which is asymmetric with respect to a normal direction of the detection face around the stress generator; and a plurality of sensors distributed and arranged around the stress generator.

Further features and aspects of the present disclosure will become apparent from the following detailed description of exemplary embodiments with reference to the attached drawings.

BRIEF DESCRIPTION OF THE DRAWINGS

FIG. 4A is a diagram illustrating a case in which the force F acts in a +X direction and FIG. 4B is a diagram illustrating a case in which the force F acts in a −X direction.

DETAILED DESCRIPTION

Figure 1:
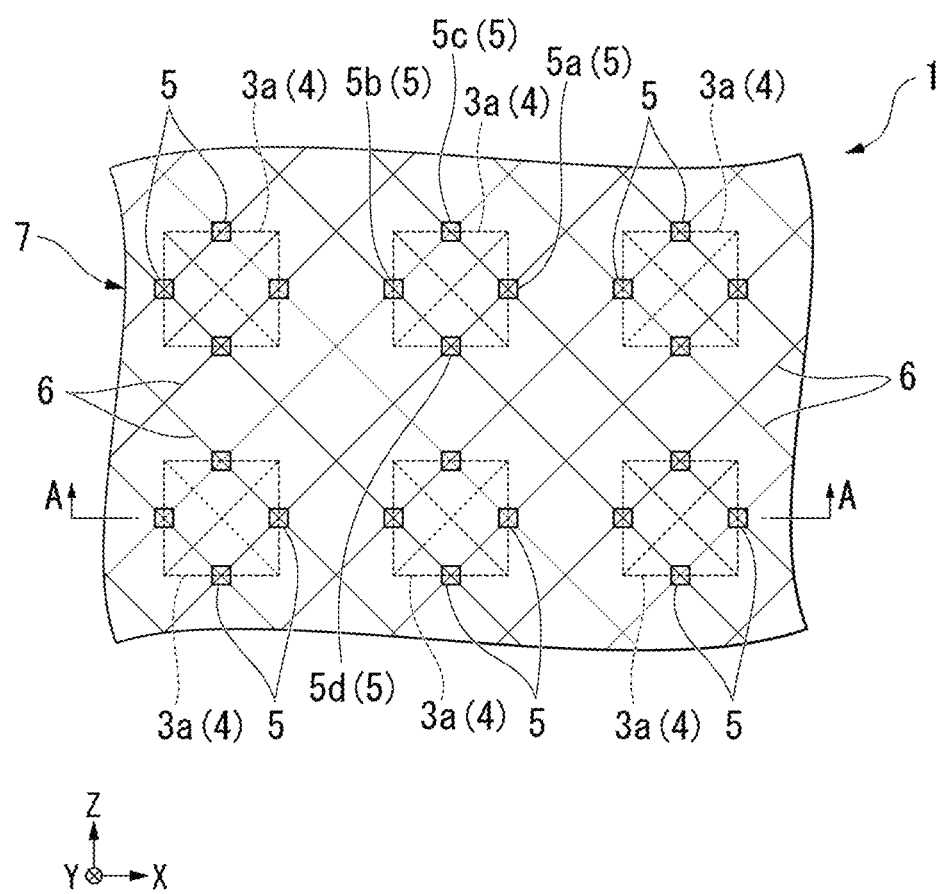
FIG. 1 is a diagram schematically illustrating a configuration of a force detector according to a first embodiment when seen in a normal direction of a detection face.

Embodiments of the present invention will be described herein with reference to the drawings.

One or more embodiments provide a force detector that does not need to have a pressure transmission member with a very large Young's modulus therein, has a high reliability, and can be easily bent.

Hereinafter, force detectors and force detection systems according to one or more embodiments will be described with reference to the accompanying drawings.

One or more embodiments are for realizing a force detector that does not need to have a pressure transmission member with a very large Young's modulus therein, has a high reliability, and can be easily bent. That is, one or more embodiments are for realizing a force detector with a high reliability that is flexible as a whole and can be deformed to an appropriate shape corresponding to a shape of a target (for example, a robot's hand).

Since the tactile sensor disclosed in Japanese Unexamined Patent Application Publication No. 2008-128940 has a structure for detecting a force by pressing the pressure-sensitive conductive member according to the inclination of the pressure transmission member, a difference in stiffness between the elastic coating layer and the pressure transmission member needs to be much increased in order to enhance the sensitivity of the pressure transmission member. For example, the Young's modulus of the elastic coating layer may be 0.6 MPa and the Young's modulus of the pressure transmission member is 100 MPa or more, which is a difference of 100 or more times. In this way, when the difference in stiffness between the elastic coating layer and the pressure transmission member is very large, there is a likelihood that the elastic coating layer and the pressure transmission member will be separated from each other at an interface therebetween due to long-term use of the tactile sensor, which may cause a decrease in detection accuracy. Since the Young's modulus of the pressure transmission member is larger, it is difficult to bend the tactile sensor as a whole and to deploy the tactile sensor on a curved surface or a shape-variable surface.

A force detector according to one or more embodiments includes a layered structure including a first layer having a detection face on which a force to be detected acts and a second layer provided on a face of the first layer opposite to the detection face and formed of a material with a Young's modulus different from that of the first layer. A stress generator (a part that is configured to receive a force acting in a tangential direction of the detection face and to generate a stress with a distribution which is asymmetric with respect to a normal direction of the detection face around the stress generator) is formed in the layered structure, and a plurality of sensors are distributed and arranged around the stress generator. Accordingly, it is possible to realize a force detector that does not need to have a pressure transmission member with a very large Young's modulus therein, has a high reliability, and can be easily bent.

First Embodiment

Figure 2:
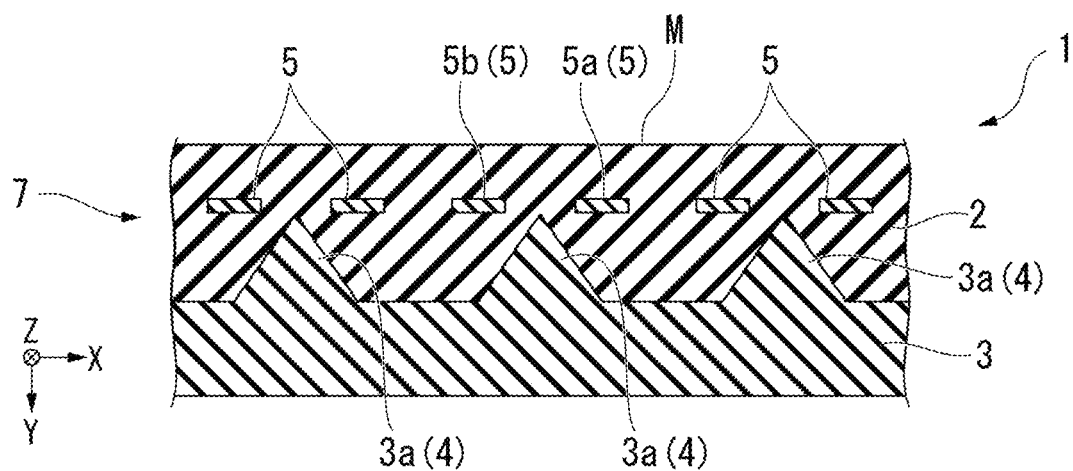
FIG. 2 is a cross-sectional view taken along line A-A in FIG. 1.
Figure 3:
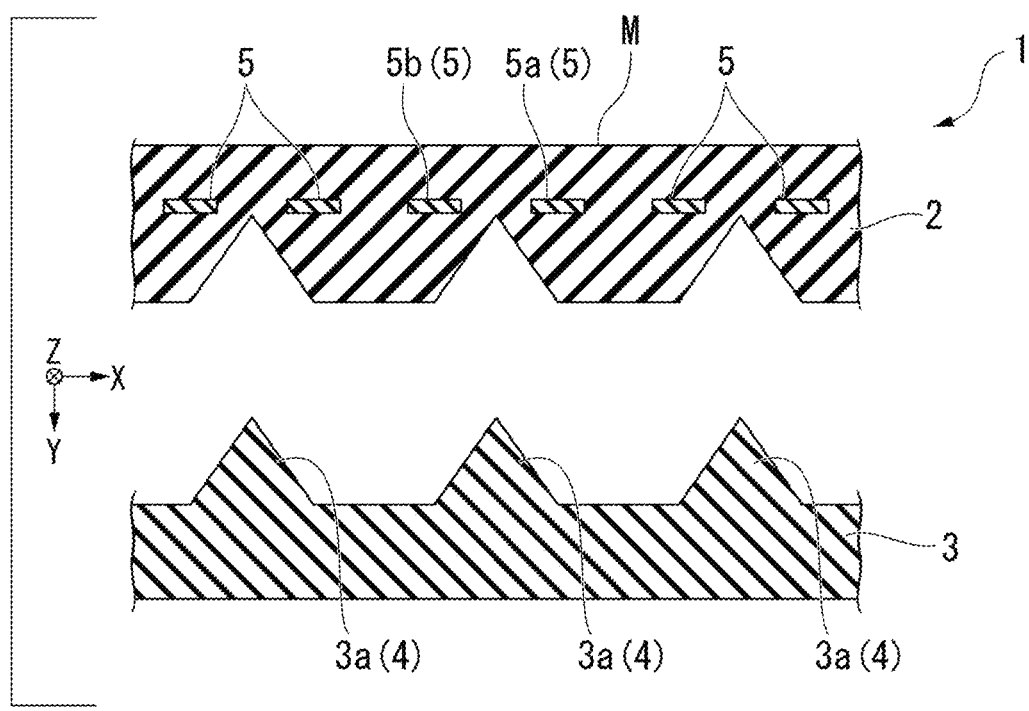
FIG. 3 is an exploded view schematically illustrating the configuration of the force detector according to the first embodiment.

FIG. 1 is a diagram schematically illustrating a configuration of a force detector according to a first embodiment when seen in a normal direction of a detection face. FIG. 2 is a cross-sectional view taken along line A-A in FIG. 1. FIG. 3 is an exploded view of the force detector according to this embodiment. For the purpose of easy visual recognition, sensors 5 and wires 6 coated by a detection layer 2 which will be described later are illustrated by solid lines in FIG. 1. In FIGS. 2 and 3, the wires 6 are omitted.

The force detector 1 according to this embodiment is a sensor that converts an external force acting on a detection face M to an electrical signal and outputs the electrical signal and is used, for example, as a tactile sensor. The force detector 1 according to this embodiment includes a detection layer 2 (a first layer), a support layer 3 (a second layer), a stress generator 4, sensors 5, and wires 6.

In the following description, for the purpose of convenience of description, a stacking direction of the detection layer 2 and the support layer 3 is defined as a Y direction, one direction perpendicular to the Y direction is defined as an X direction, and a direction perpendicular to the X direction and the Y direction is defined as a Z direction as illustrated in FIGS. 1 to 3. An installation posture of the force detector 1 according to this embodiment is not particularly limited with respect to a direction of gravity.

The detection layer 2 is stacked on the support layer 3 and is a layer of which a surface opposite to the support layer 3 is the detection face M. In this embodiment, the detection layer 2 is formed of a material with a smaller Young's modulus than that of the support layer 3. For example, the detection layer 2 may be formed of a silicone resin with a smaller Young's modulus than that of a material of the support layer 3. The detection layer 2 has only to be formed of a material with a smaller Young's modulus than that of the support layer 3 and may also be formed of an acryl resin or an urethane resin.

The detection face M is a face on which a force to be detected acts and is a plane in this embodiment. The detection face M is a plane parallel to an X-Z plane. The detection face M may be a curved face. In this embodiment, an external object directly touches the detection face M and a force applied from the object is a force to be detected. The force detector 1 according to this embodiment can detect both a force component acting in a tangential direction (a direction parallel to the X-Z plane) of the detection face M and a force component pressing the detection face M in a normal direction of the detection face M.

The support layer 3 is fixed to a surface of the detection layer 2 opposite to the detection face M and supports the detection layer 2. As described above, the detection layer 2 is formed of a material with a smaller Young's modulus than that of the support layer 3. That is, the support layer 3 is formed of a material with a larger Young's modulus than that of the detection layer 2. For example, the support layer 3 may be formed of a silicone resin with a larger Young's modulus than that of a material of the detection layer 2. The support layer 3 has only to be formed of a material with a larger Young's modulus than that of the detection layer 2 and may also be formed of an acryl resin or an urethane resin.

The force detector 1 according to this embodiment has a structure in which the detection layer 2 and the support layer 3 are stacked, that is, a layered structure 7 including the detection layer 2 and the support layer 3. The stress generator 4 is formed in such a layered structure 7. The stress generator 4 receives a force acting in the tangential direction of the detection face M and generates a stress with a distribution which is asymmetric with respect to the normal direction of the detection face M around the stress generator 4. In this embodiment, the support layer 3 includes a protrusion 3a protruding toward the detection layer 2, and the protrusion 3a serves as the stress generator 4. That is, the force detector 1 according to this embodiment includes a protrusion 3a that protrudes from the layer with a relatively large Young's modulus (the support layer 3 side) to the layer with a relatively small Young's modulus (the detection layer 2 side) as the stress generator 4.

As illustrated in FIG. 1, a plurality of protrusions 3a are arranged in an array shape. In this embodiment, the protrusions 3a have the same quadrangular pyramid shape. Since the protrusions 3a are formed as parts of the support layer 3, for example, as illustrated in FIG. 3, the protrusions 3a are formed of a material with a larger Young's modulus than that of the detection layer 2. In this embodiment, the plurality of protrusions 3a are arranged at equal intervals in the X direction and the Z direction. The arrangement spacing of the plurality of protrusions 3a can change. The plurality of protrusions 3a may be arranged at unequal intervals.

Figures 4A, 4B:
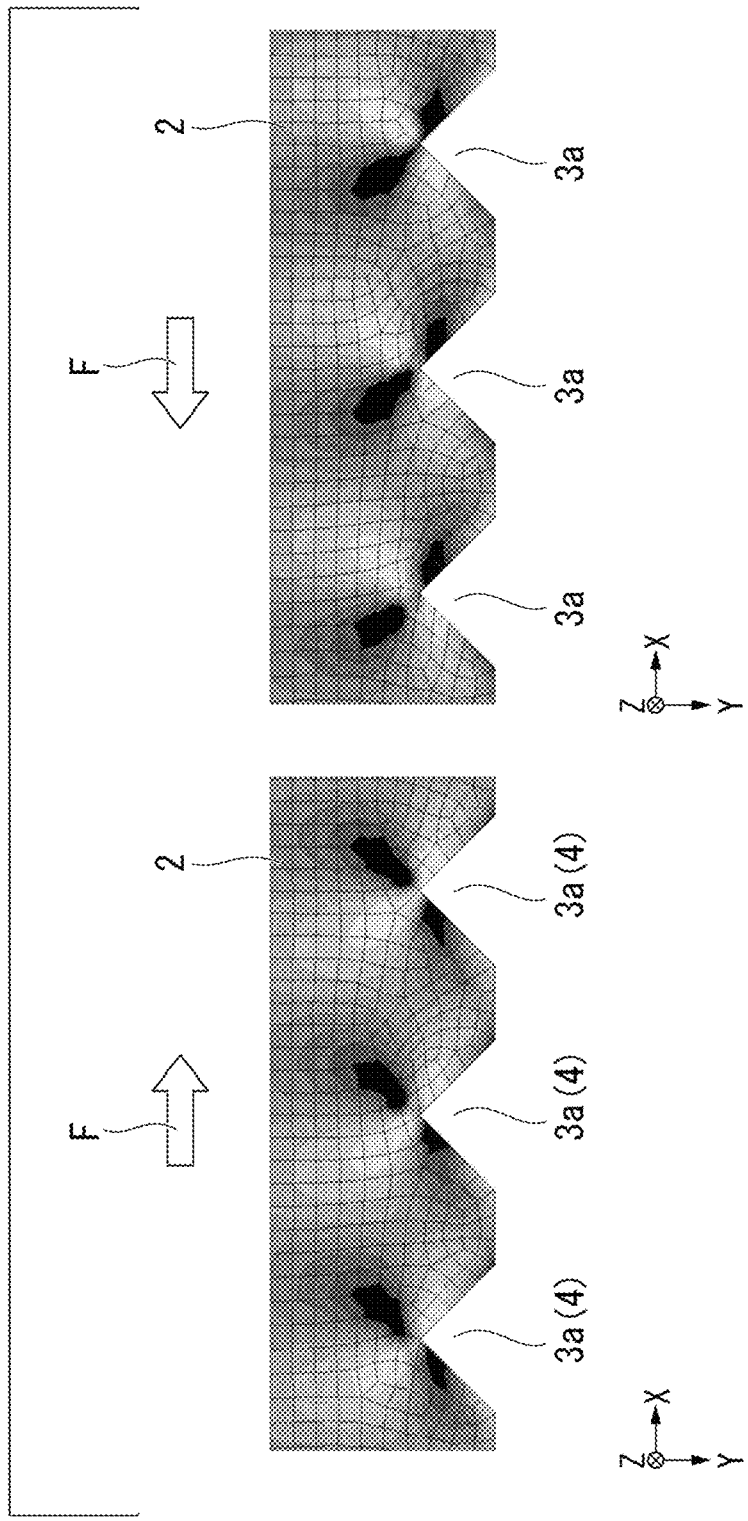
FIGS. 4A and 4B are diagrams illustrating a simulation result representing a normal strain distribution in a Y direction of a detection layer when a force F acts on the detection face of the detection layer in a tangential direction of the detection face, where

FIGS. 4A and 4B are diagrams illustrating a simulation result representing a normal strain distribution in the Y direction of the detection layer 2 when a force F acts on the detection face M of the detection layer 2 in a tangential direction of the detection face M, where FIG. 4A is a diagram illustrating a case in which the force F acts in the +X direction and FIG. 4B is a diagram illustrating a case in which the force F acts in the −X direction. In FIGS. 4A and 4B, compressive stains and tensile strains are expressed by depth of color. A part of a dark color (a black part) is a compressive-strain part and a part of a light color (a white part) is a tensile-strain part.

When a force F acts on the detection face M in the +X direction as illustrated in FIG. 4A, the entire detection layer 2 tries to move in the +X direction. Since the Young's modulus of the protrusions 3a is larger than that of the detection layer 2, a part of the detection layer 2 on the −X side of each protrusion 3a is pressed and compressed by the protrusion 3a. Accordingly, a compressive strain is generated in the part on the −X side of the protrusion 3a. On the other hand, a part of the detection layer 2 on the +X side of each protrusion 3a is located behind the protrusion 3a in the acting direction of the force F and is dragged by the protrusion 3a with small deformation, and thus a tensile strain is generated. As illustrated in FIG. 4A, in a part closer to the detection face M than an apex of each protrusion 3a, the compressive strain increases in a part on the +X side of the apex of the protrusion 3a and the tensile strain increases in a part on the −X side of the apex of the protrusion 3a.

When a force F acts on the detection face M in the −X direction as illustrated in FIG. 4B, the entire detection layer 2 tries to move in the −X direction. A part of the detection layer 2 on the +X side of each protrusion 3a is pressed and compressed by the protrusion 3a. Accordingly, a compressive strain is generated in the part on the +X side of the protrusion 3a. On the other hand, a tensile strain increases in a part of the detection layer 2 on the −X side of each protrusion 3a. As illustrated in FIG. 4B, in a part closer to the detection face M than an apex of each protrusion 3a, the compressive strain increases in the part on the −X side of the apex of the protrusion 3a and the tensile strain increases in the part on the +X side of the apex of the protrusion 3a.

As illustrated in FIGS. 4A and 4B, when a force F acts in the tangential direction of the detection face M, a magnitude of a strain differs between an upstream side and a downstream side of the force F with respect to each protrusion 3a. This means that the protrusion 3a receives the force F acting in the tangential direction of the detection face M and generates a strain distribution which is asymmetric with respect to the normal direction of the detection face M around the protrusion. A strain distribution corresponds to a stress distribution. Accordingly, each protrusion 3a receives the force F acting in the tangential direction of the detection face M and generates a stress distribution which is asymmetric with respect to the normal direction of the detection face M around the protrusion. In this embodiment, a plurality of protrusions 3a are formed inside of a layered structure 7 as illustrated in FIG. 2.

In comparison between FIGS. 4A and 4B, when the direction of the force F acting in the tangential direction of the detection face M is inverted, the strain distribution (that is, a stress distribution) is also inverted. Accordingly, the direction of the force F acting in the tangential direction of the detection face M can be acquired by detecting the stress distribution. When the detection face M is pressed in the normal direction, strains (that is, stresses) with equal magnitudes are generated in the X direction and the Z direction of each protrusion 3a. Accordingly, the direction of the force F acting on the detection face M can be acquired by detecting a stressed part of the detection layer 2 around the protrusion 3a.

As described above, in this embodiment, since the protrusion 3a having a quadrangular pyramid shape is provided, the magnitude or the direction of a stress applied to the surroundings of the protrusion 3a changes depending on the direction of the force F acting on the detection face M. The shape of the protrusion 3a is not limited to a quadrangular pyramid. The protrusion 3a has only to have a shape in which the magnitude or the direction of a stress applied to the surroundings of the protrusion 3a changes depending on the direction of a force F acting on the detection face M and may have, for example, a polygonal prism shape, a cylinder shape, a hemisphere shape, a cone shape, or a polygonal pyramid shape other than a quadrangular pyramid. In this embodiment, all the protrusions 3a have the same shape, but may include a protrusion 3a having another shape.

The sensors 5 are disposed by being embedded in the detection layer 2 as illustrated in FIGS. 2 and 3. A strain sensor that detects a strain can be used as each sensor 5. A pressure distribution corresponding to the stress distribution is also generated in the detection layer 2. Accordingly, a pressure sensor that detects a pressure can also be used as each sensor 5.

Four sensors 5 are provided for each protrusion 3a. As illustrated in FIG. 1, four sensors 5 are provided to surround the apex of each protrusion 3a. For the purpose of description, as illustrated in FIG. 1, the sensor 5 located at a position displaced in the +X direction from the apex is defined as a sensor 5a, the sensor 5 located at a position displaced in the −X direction from the apex is defined as a sensor 5b, the sensor 5 located at a position displaced in the +Z direction from the apex is defined as a sensor 5c, and the sensor 5 located at a position displaced in the −Z direction from the apex is defined as a sensor 5d according to necessity. The sensors 5 are located on the detection face M side of the apex of the protrusion 3a as illustrated in FIG. 2.

The sensors 5 output signals of intensities corresponding to the stress (that is, a strain or a pressure) generated in the detection layer 2. What force F acts on the detection face M at a position in the −Y side of the protrusion 3a can be calculated based on values (hereinafter referred to as detection values) indicated by the output signals of the four sensors 5 provided for each protrusion 3a. In this embodiment, it is assumed that each sensor 5 employs a mode in which it outputs a negative value in a compressive strain and outputs a positive value in a tensile strain. For example, a piezo-resistive strain gauge may be used as such a sensor 5. A sensor employing a mode in which it outputs a positive value in a compressive strain and outputs a negative value in a tensile strain may also be used.

For example, when a force F acts in only the X direction, since the detection value from the sensor 5a is negative (a compressive strain), and the detection value from the sensor 5b is positive (a tensile strain), it can be seen that the force F acts in the +X direction of the detection face M as illustrated in FIG. 4A. The magnitude of the force F acting in the +X direction can be calculated based on a difference between the detection value from the sensor 5b and the detection value from the sensor 5a.

When a force F acts in only the X direction, since the detection value from the sensor 5a is positive (a tensile strain), and the detection value from the sensor 5b is negative (a compressive strain), it can be seen that the force F acts in the −X direction of the detection face M as illustrated in FIG. 4B. The magnitude of the force F acting in the −X direction can be calculated based on a difference between the detection value from the sensor 5*a* and the detection value from the sensor 5*b*.

When a force F acts in only the Z direction, since the detection value from the sensor 5*c* is negative (a compressive strain), and the detection value from the sensor 5*d* is positive (a tensile strain), it can be seen that the force F acts in the +Z direction of the detection face M. The magnitude of the force F acting in the +Z direction can be calculated based on a difference between the detection value from the sensor 5*d* and the detection value from the sensor 5*c*.

When a force F acts in only the Z direction, since the detection value from the sensor 5*c* is positive (a tensile strain), and the detection value from the sensor 5*d* is negative (a compressive strain), it can be seen that the force F acts in the −Z direction of the detection face M. The magnitude of the force F acting in the −Z direction can be calculated based on a difference between the detection value from the sensor 5*c* and the detection value from the sensor 5*d*.

When detection values are output from four sensors 5 and the detection values are the same magnitude or substantially the same magnitude, it can be seen that a force F acts in the normal direction of the detection face M. The magnitude of the force F acting in the normal direction of the detection face M can be calculated based on the magnitudes of the detection values (or the sum of the detection values).

In this way, when a force F is applied to the detection face M which is a surface of the force detector 1, a strain or a pressure is generated in the layered structure 7. When a force F is applied in the tangential direction of the detection face M, the protrusion 3*a* is less deformed than the detection layer 2 around the protrusion 3*a* because it is formed of a material with a larger Young's modulus than that of the detection layer 2. Accordingly, a strain or a pressure around the protrusion 3*a* changes more greatly than in the protrusion 3*a* according to the direction or the magnitude of the force F. The strain or the pressure (that is, a stress) around the protrusion 3*a* is detected by the sensors 5.

As illustrated in FIGS. 4A and 4B, the distribution of the strain is inverted by inverting the direction in which the force F is applied. Accordingly, an output difference between two sensors 5 arranged with the protrusion 3*a* interposed therebetween includes information of the direction of the force F and the magnitude of the force F. On the other hand, when a force in the normal direction with a uniform distribution is applied to the detection face M, the same strain is applied to two sensors 5 arranged with the protrusion 3*a* interposed therebetween. Accordingly, the sum of the outputs of the two sensors 5 includes information of the magnitude of the force F. The magnitude and the direction of the force F applied to the force detector 1 can be calculated based on the difference and the sum of the outputs of the sensors 5.

Figure 5:
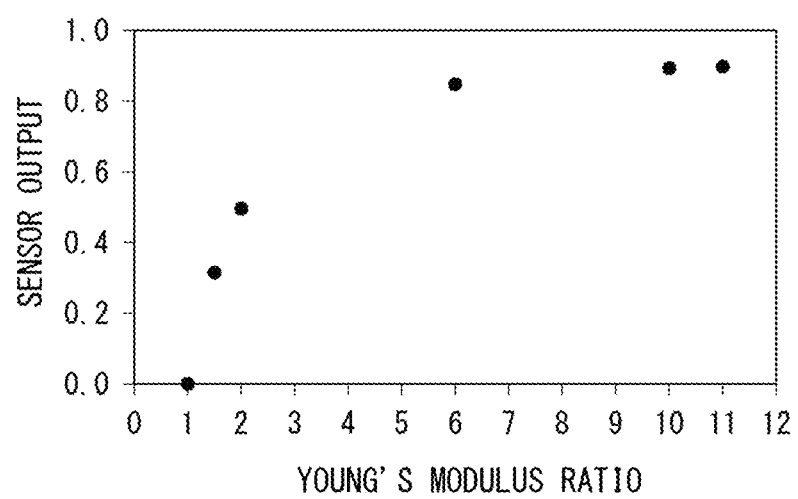
FIG. 5 is a graph illustrating a relationship between a Young's modulus ratio and a sensor output.

FIG. 5 is a graph illustrating a relationship between a value (a Young's modulus ratio) obtained by dividing the Young's modulus of the protrusion 3*a* (the support layer 3 in this embodiment) by the Young's modulus of the detection layer 2 and output intensities (sensor outputs) of the sensors 5. In FIG. 5, normalization is performed with the sensor output when the Young's modulus ratio is infinite as 1. As illustrated in FIG. 5, when the Young's modulus ratio is equal to or greater than 2, a sensor output which is about half the sensor output when the Young's modulus ratio is infinite is obtained.

The wires 6 are connected to the sensors 5, serve to take out an output signal from the sensors 5, and are disposed by being embedded in the detection layer 2 in this embodiment. In this embodiment, a plurality of wires 6 connected to output terminals of one side of the sensors 5 are arranged in parallel in the vertical direction, and a plurality of wires 6 connected to output terminals of the other side of the sensors 5 are arranged in parallel in the horizontal direction, whereby a matrix wiring structure in which the wires 6 in the vertical direction and the wires 6 in the horizontal direction cross each other when seen in the normal direction of the detection face M is provided. The wiring pattern of the wires 6 is not particularly limited as long as an output signal of each sensor 5 can be taken out.

The sensors 5 and the wires 6 which are disposed by being embedded in the detection layer 2 do not hinder deformation of the detection layer 2 when a force F acts on the detection face M. Accordingly, the sensors 5 and the wires 6 may be formed of a material with the same Young's modulus as the detection layer 2. The sensors 5 and the wires 6 can be formed using a printing method such as an inkjet printing method, a screen printing method, or a gravure offset printing method.

In the force detector 1 according to this embodiment, as described above, a stress distribution is generated in the detection layer 2 when a force F acts on the detection face M. At this time, when the force F acts in the tangential direction of the detection face M, a stress distribution which is asymmetric with respect to the normal direction of the detection face M is generated around the protrusion 3*a* by the protrusion 3*a*. This stress distribution is detected by a plurality of sensors 5. As described above, the direction and the magnitude of the force F can be calculated based on the stress distribution around the protrusion 3*a*. Accordingly, with the force detector 1 according to this embodiment, it is possible to acquire detection values that enable calculation of the force F without providing a pressure transmission member with a very large Young's modulus (for example, about 100 times the Young's modulus of the detection layer 2) therein.

As described above, the force detector 1 according to this embodiment includes the detection layer 2 including the detection face M on which a force F to be detected acts and the support layer 3 provided on the face of the detection layer 2 opposite to the detection face M and formed of a material with a Young's modulus different from that of the detection layer 2. The force detector 1 further includes the stress generator 4 and the sensors 5. The stress generator 4 is formed in the layered structure 7 including the detection layer 2 and the support layer 3, receives a force acting in the tangential direction of the detection face M, and generates a stress with a distribution which is asymmetric with respect to the normal direction of the detection face M around the stress generator. A plurality of sensors 5 are distributed and arranged around the stress generator 4.

In the force detector 1 according to this embodiment, the stress generator 4 that receives a force F acting in the tangential direction of the detection face M of the detection layer 2 and generates a stress with a distribution which is asymmetric with respect to the normal direction of the detection face M around the stress generator is provided in the layered structure 7 including the detection layer 2 and the support layer 3. Even when a difference in Young's modulus between the detection layer 2 and the support layer 3 is small, it is possible to generate a stress with an asymmetric distribution using the stress generator 4. Accordingly, with the force detector 1 according to this embodiment, a pressure transmission member with a very large Young's modulus does not need to be provided therein and it is possible to suppress a phenomenon in which the pressure transmission member is separated from a neighboring layer and to enhance a reliability. The detection layer 2 and the support layer 3 can have similar Young's moduli and both the detection layer 2 and the support layer 3 can be formed of a flexibly deformable material. Accordingly, the force detector 1 according to this embodiment can be easily bent.

In the force detector 1 according to this embodiment, the sensors 5 are disposed by being embedded in the layer with a relatively small Young's modulus (the detection layer 2 in this embodiment) out of the detection layer 2 and the support layer 3. A strain or the like is generated in the layer with a relatively large Young's modulus, but the strain or the like in the layer with a relatively small Young's modulus is greater. Accordingly, by installing the sensors 5 in the layer with a relatively small Young's modulus, it is possible to more easily detect the strain or the like (that is, the stress). However, the sensor 5 may be able to be installed in the layer with a relatively large Young's modulus.

In the force detector 1 according to this embodiment, the protrusions 3a protruding from the layer with a relatively large Young's modulus (the support layer 3 in this embodiment) out of the detection layer 2 and the support layer 3 to the layer with a relatively small Young's modulus (the detection layer 2 in this embodiment) are provided as the stress generator 4. With the force detector 1 according to this embodiment, it is possible to simplify the structure of the stress generator 4. Since the sensors 5 are arranged around each protrusion 3a, it is possible to easily draw the wires 6 connected to the sensors 5 to avoid the protrusions 3a.

Second Embodiment

A second embodiment will be described below with reference to FIGS. 6 and 7. In describing this embodiment, description of the same constituents as in the first embodiment will be omitted or simplified.

Figure 6:
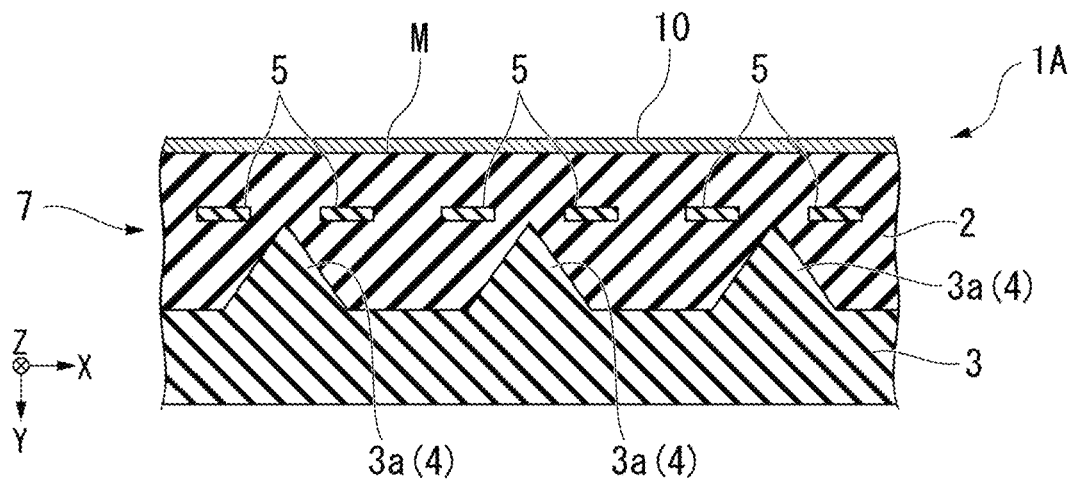
FIG. 6 is a sectional view schematically illustrating a configuration of a force detector according to a second embodiment.
Figure 7:
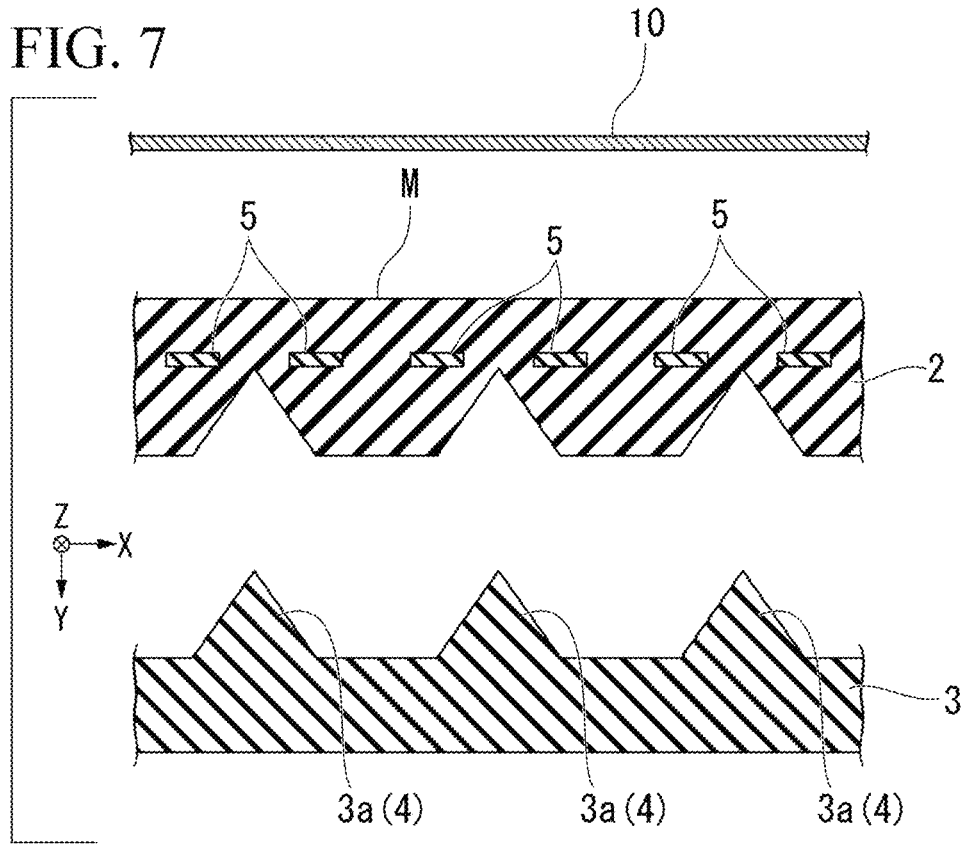
FIG. 7 is an exploded view schematically illustrating the configuration of the force detector according to the second embodiment.

FIG. 6 is a sectional view schematically illustrating a configuration of a force detector 1A according to this embodiment. FIG. 7 is an exploded view schematically illustrating the configuration of the force detector 1A according to this embodiment. As illustrated in the drawings, the force detector 1A according to this embodiment includes a force dispersing layer 10 that is provided on the detection face M of the detection layer 2. That is, in the force detector 1A according to this embodiment, the layered structure 7 includes the force dispersing layer 10 in addition to the detection layer 2 and the support layer 3.

The force dispersing layer 10 is formed of a material with a larger Young's modulus than that of the detection layer 2. For example, the force dispersing layer 10 may be formed of a silicone resin with a larger Young's modulus than that of a material of the detection layer 2. The force dispersing layer 10 has only to be formed of a material with a larger Young's modulus than that of the detection layer 2 and may also be formed of an acryl resin or an urethane resin. The force dispersing layer 10 has only to be able to disperse a force F on the XZ plane and a thickness (a dimension in the Y direction) thereof can be less than those of the detection layer 2 and the support layer 3.

When the force dispersing layer 10 is not provided and a force F of a spatial frequency with a shorter period than the arrangement spacing (the period of the stress generator 4) of the stress generators 4 (the protrusions 3a) acts on the detection face M, a force component different from an actual force F is output as an error by the sampling theorem. On the other hand, when the force dispersing layer 10 is provided, the force F is dispersed on the XZ plane and the spatial frequency of the force F acting on the detection face M is decreased. Accordingly, it is possible to prevent a force component different from the actual force F from being output as an error.

In this way, the force detector 1A according to this embodiment includes the force dispersing layer 10 stacked on the detection face M of the detection layer 2 and formed of a material with a larger Young's modulus than that of the detection layer 2. Accordingly, it is possible to prevent a force component different from the actual force F from being output as an error and to reduce a detection error.

By adjusting the thicknesses (the dimensions in the Y direction) or the Young's moduli of the force dispersing layer 10 and the detection layer 2, it is possible to adjust a cutoff frequency of the spatial frequency.

Third Embodiment

A third embodiment will be described below with reference to FIGS. 8 and 9. In describing this embodiment, description of the same constituents as in the first and second embodiments will be omitted or simplified.

Figure 8:
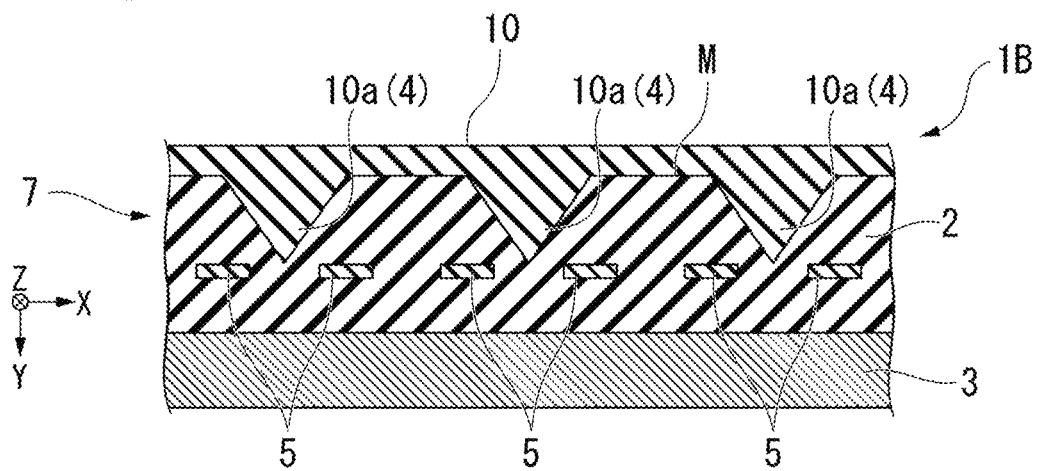
FIG. 8 is a sectional view schematically illustrating a configuration of a force detector according to a third embodiment.

FIG. 8 is a sectional view schematically illustrating a configuration of a force detector 1B according to this embodiment. FIG. 9 is an exploded view schematically illustrating the configuration of the force detector 1B according to this embodiment. As illustrated in the drawings, the force detector 1B according to this embodiment includes a protrusion 10a (a stress generator) protruding from the force dispersing layer 10 to the detection layer 2. On the other hand, in the force detector 1B according to this embodiment, the protrusions 3a are not provided in the support layer 3. That is, in the force detector 1B according to this embodiment, a protrusion 10a (a force distributing layer protrusion) of the force dispersing layer 10 is provided as the stress generator 4.

In the force detector 1B according to this embodiment, a protrusion 10a provided in the force dispersing layer 10 serves as the stress generator 4. That is, the force detector 1B according to this embodiment includes the protrusion 10a protruding from the layer with a relatively large Young's modulus (the force dispersing layer 10 side) to the layer with a relatively small Young's modulus (the detection layer 2 side) as the stress generator 4.

A plurality of protrusions 10a are arranged in an array shape, for example, at the same positions as the protrusions 3a according to the first embodiment when seen in the normal direction of the detection face M. In this embodiment, the protrusions 10a have the same quadrangular pyramid shape. Since the protrusions 10a are formed as parts of the force dispersing layer 10, for example, as illustrated in FIG. 8, the protrusions 10a are formed of a material with a larger Young's modulus than that of the detection layer 2. In this embodiment, the plurality of protrusions 10a are arranged at equal spacing in the X direction and the Z direction. The arrangement spacing of the plurality of protrusions 10a can change. The plurality of protrusions 10a may be arranged at unequal spacing.

In the force detector 1B according to this embodiment, since the protrusion 10a having a quadrangular pyramid shape is provided, the magnitude or the direction of a stress applied to the surroundings of the protrusion 10a changes depending on the direction of the force F acting on the detection face M. The shape of the protrusion 10a is not limited to the quadrangular pyramid. The protrusion 10a has only to have a shape in which the magnitude or the direction of a stress applied to the surroundings of the protrusion 10a changes depending on the direction of a force F acting on the detection face M and may have, for example, a polygonal prism shape, a cylinder shape, a hemisphere shape, a cone shape, or a polygonal pyramid shape other than a quadrangular pyramid. In this embodiment, all the protrusions 10a have the same shape, but may include a protrusion 10a having another shape.

Four sensors 5 are provided for each protrusion 10a. The sensors 5 are provided at a position displaced in the +X direction from a downward apex of the protrusion 10a, a position displaced in the −X direction from the apex, a position displaced in the +Z direction from the apex, and a position displaced in the −Z direction from the apex such that they surround the apex when seen in the normal direction of the detection face M. As illustrated in FIG. 8, the sensors 5 are disposed on the support layer 3 side of the downward apex of the protrusion 10a.

The sensors 5 output signals of intensities corresponding to the stress (that is, a strain or a pressure) generated in the detection layer 2. What force F acts on a part of the detection face M located on the −Y side of the protrusion 10a can be calculated based on the detection values from the four sensors 5 provided for each protrusion 10a.

In this way, when a force F is applied to the detection face M of the force detector 1B, a strain or a pressure is generated in the layered structure 7. When a force F is applied in the tangential direction of the detection face M, the protrusion 10a is less deformed than the detection layer 2 around the protrusion 10a because it is formed of a material with a larger Young's modulus than that of the detection layer 2. Accordingly, a strain or a pressure around the protrusion 10a changes more greatly than the protrusion 10a according to the direction or the magnitude of the force F. The strain or the pressure (that is, a stress) around the protrusion 10a is detected by the sensors 5. The distribution of the strain is inverted by inverting the direction in which the force F is applied. Accordingly, an output difference between two sensors 5 arranged with the protrusion 10a interposed therebetween includes information of the direction of the force F and the magnitude of the force F.

On the other hand, when a force in the normal direction with a uniform distribution acts on the detection face M, the same strain is applied to two sensors 5 arranged with the protrusion 10a interposed therebetween. Accordingly, the sum of the outputs of the two sensors 5 includes information of the magnitude of the force F. The magnitude and the direction of the force F applied to the force detector 1B can be calculated based on the difference and the sum of the outputs of the sensors 5.

Figure 9:
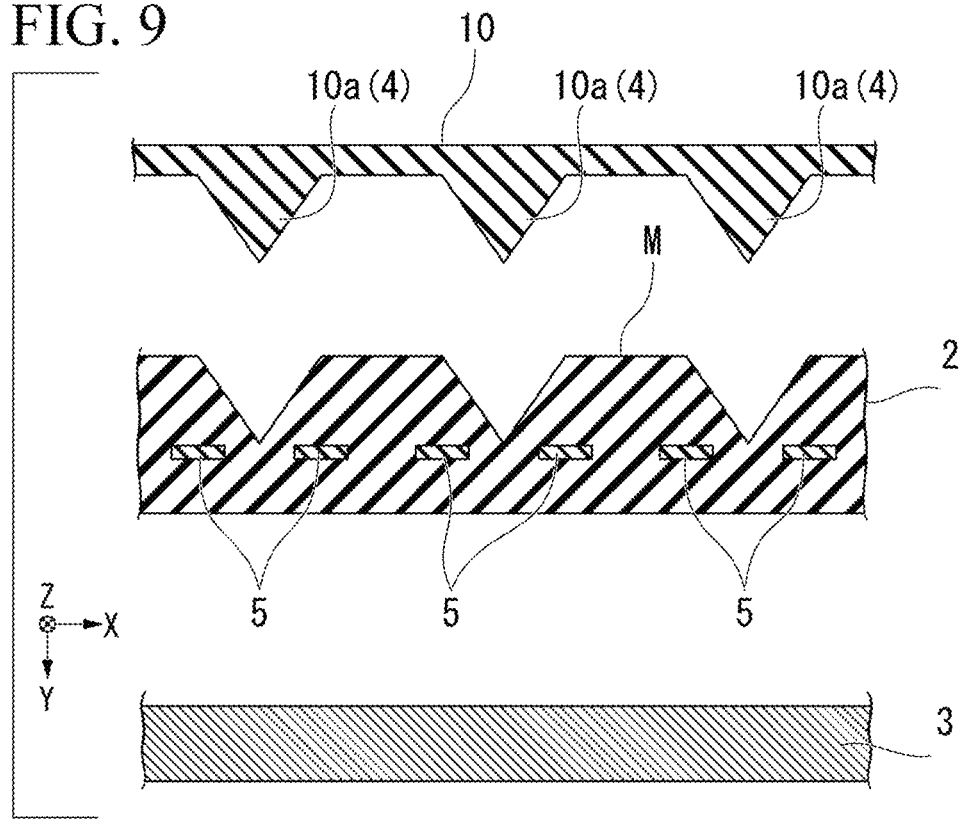
FIG. 9 is an exploded view schematically illustrating the configuration of the force detector according to the third embodiment.

With the force detector 1B according to this embodiment, since the protrusion 10a of the force dispersing layer 10 serves as the stress generator 4, a configuration in which a protrusion 3a is not provided in the support layer 3 becomes possible as illustrated in FIGS. 8 and 9.

Fourth Embodiment

A fourth embodiment will be described below with reference to FIGS. 10 and 11. In describing this embodiment, description of the same constituents as in the first and second embodiments will be omitted or simplified.

Figure 10:
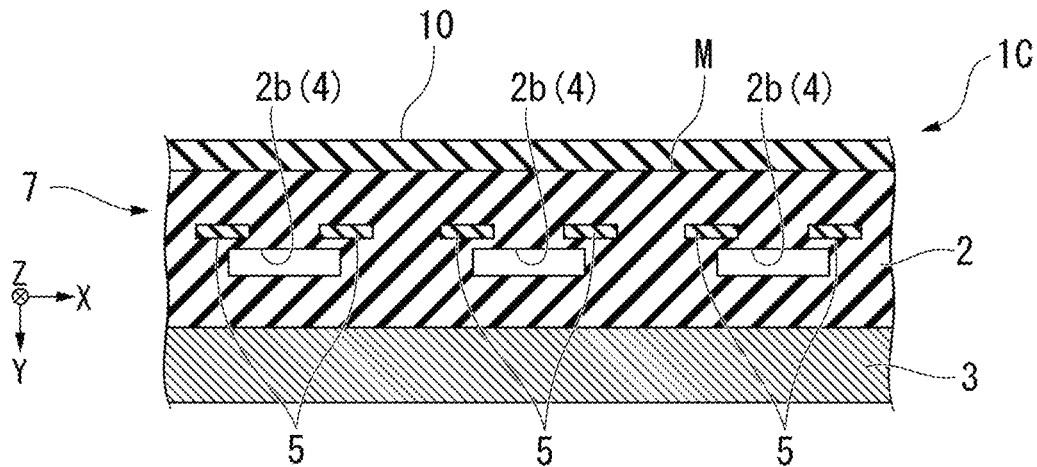
FIG. 10 is a sectional view schematically illustrating a configuration of a force detector according to a fourth embodiment.
Figure 11:
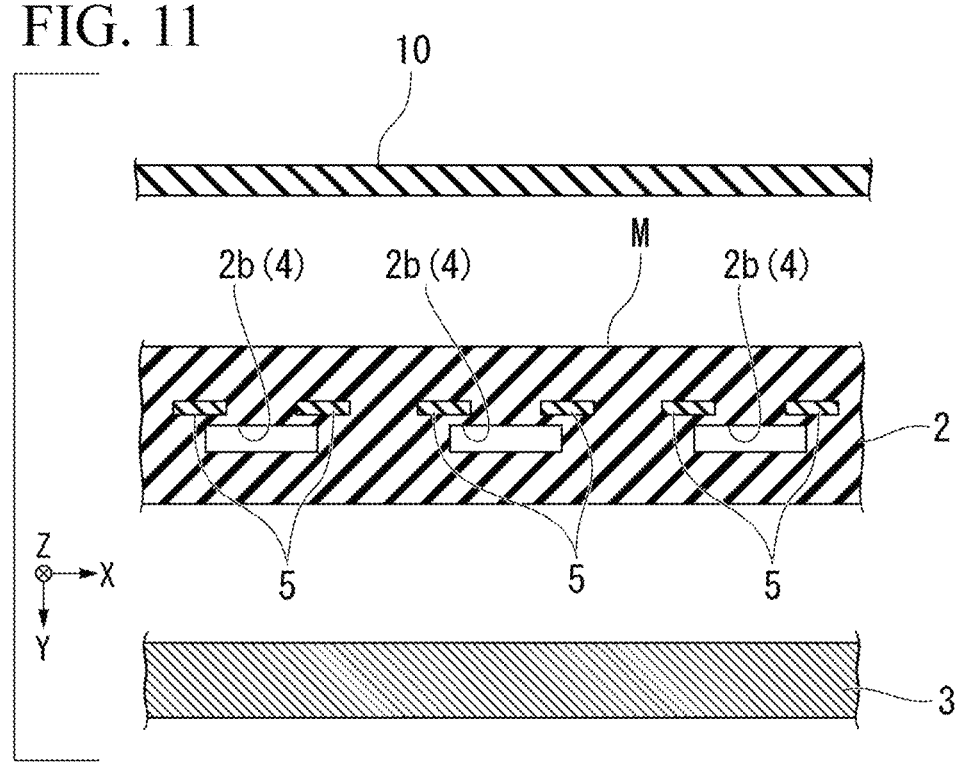
FIG. 11 is an exploded view schematically illustrating the configuration of the force detector according to the fourth embodiment.

FIG. 10 is a sectional view schematically illustrating a configuration of a force detector 1C according to this embodiment. FIG. 11 is an exploded view schematically illustrating the configuration of the force detector 1C according to this embodiment. As illustrated in the drawings, the force detector 1C according to this embodiment includes a void 2b (a stress generator) that is provided in the detection layer 2. On the other hand, in the force detector 1C according to this embodiment, the protrusions 3a are not provided in the support layer 3. That is, in the force detector 1C according to this embodiment, a void 2b is provided as the stress generator 4.

In the force detector 1C according to this embodiment, the void 2b provided in the detection layer 2 serves as the stress generator 4. That is, the force detector 1C according to this embodiment includes the void 2b formed in the layer with a relatively small Young's modulus (the detection layer 2 side in this embodiment) out of the detection layer 2 and the support layer 3 as the stress generator 4.

A plurality of voids 2b are arranged in an array shape, for example, at the same positions as the protrusions 3a according to the first embodiment when seen in the normal direction of the detection face M. In this embodiment, the voids 2b have the same rectangular parallelepiped shape. In this embodiment, the plurality of voids 2b are arranged at equal spacing in the X direction and the Z direction. The arrangement spacing of the plurality of voids 2b can change. The plurality of voids 2b may be arranged at unequal spacing.

In the force detector 1C according to this embodiment, since the void 2b having a rectangular parallelepiped shape is provided, the magnitude or the direction of a stress applied to the surroundings of the void 2b changes depending on the direction of the force F acting on the detection face M. The shape of the void 2b is not limited to the rectangular parallelepiped shape. The void 2b has only to have a shape in which the magnitude or the direction of a stress applied to the surroundings of the void 2b changes depending on the direction of a force F acting on the detection face M and may have, for example, a quadrangular pyramid shape, a cylinder shape, or a hemisphere shape. In this embodiment, all the voids 2b have the same shape, but may include a void 2b having another shape.

Four sensors 5 are provided for each void 2b. The sensors 5 are arranged at a position displaced in the +X direction from a center position of the void 2b, a position displaced in the −X direction from the center position, a position displaced in the +Z direction from the center position, and a position displaced in the −Z direction from the center position such that they surround the center position when seen in the normal direction of the detection face M. As illustrated in FIG. 10, the sensors 5 are disposed on the detection face M side of the void 2b.

The sensors 5 output signals of intensities corresponding to the stress (that is, a strain or a pressure) generated in the detection layer 2. What force F acts on a part of the detection face M located on the −Y side of the void 2b can be calculated based on the detection values from the four sensors 5 provided for each void 2b.

In this way, when a force F is applied to the detection face M of the force detector 1C, a strain or a pressure is generated in the layered structure 7. When a force F is applied in the tangential direction of the detection face M, an asymmetric strain distribution is generated around the void 2b due to stress relax or stress concentration due to the void 2b. The strain or the pressure (that is, a stress) around the void 2b is detected by the sensors 5. The distribution of the strain is inverted by inverting the direction in which the force F is applied. Accordingly, an output difference between two sensors 5 arranged with the void 2b interposed therebetween includes information of the direction of the force F and the magnitude of the force F.

On the other hand, when a force in the normal direction with a uniform distribution is applied to the detection face M, the same strain is applied to two sensors 5 arranged with the void 2b interposed therebetween. Accordingly, the sum of the outputs of the two sensors 5 includes information of the magnitude of the force F. The magnitude and the direction of the force F applied to the force detector 1C can be calculated based on the difference and the sum of the outputs of the sensors 5.

With the force detector 1C according to this embodiment, since the void 2b is provided as the stress generator 4, a configuration in which a protrusion is not provided in the support layer 3 or the force dispersing layer 10 becomes possible. Here, the force detector 1C may include the protrusion 3a according to the first embodiment and the protrusion 10a according to the second embodiment in addition to the void 2b.

Fifth Embodiment

A fifth embodiment will be described below with reference to FIGS. 12 and 13. In describing this embodiment, description of the same constituents as in the first embodiment will be omitted or simplified.

Figure 12:
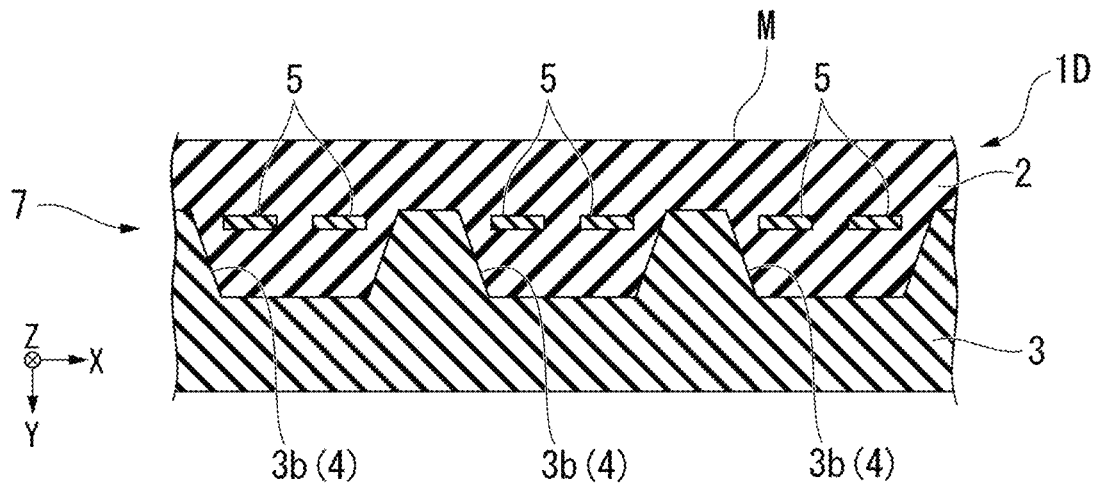
FIG. 12 is a sectional view schematically illustrating a configuration of a force detector according to a fifth embodiment.
Figure 13:
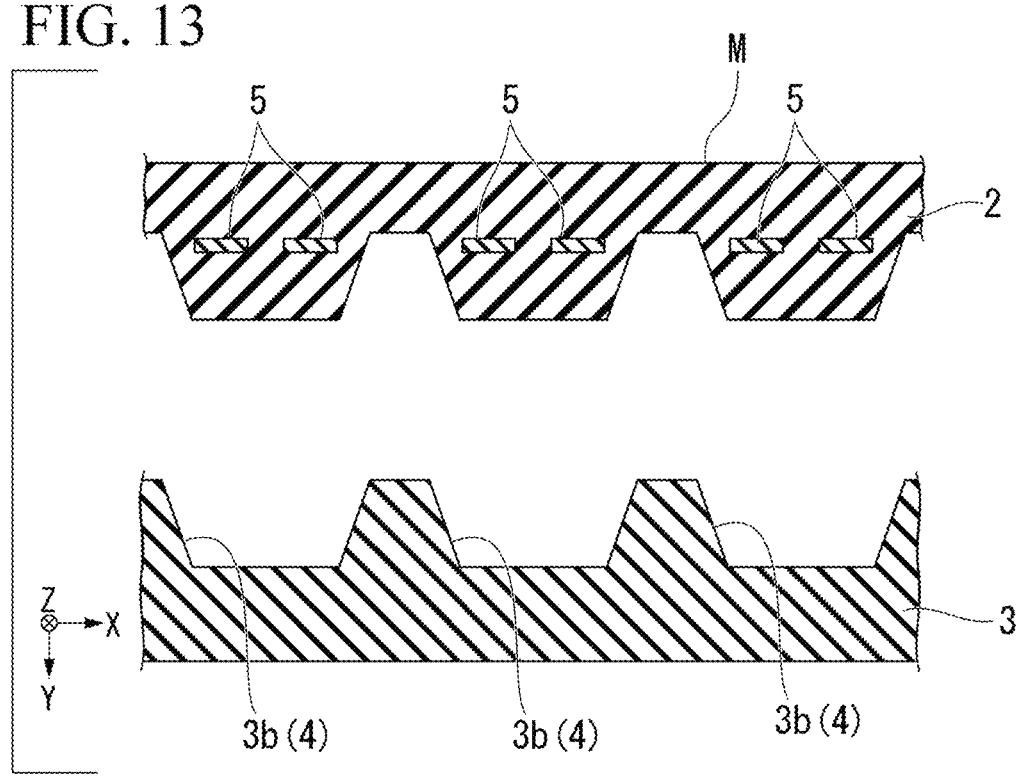
FIG. 13 is an exploded view schematically illustrating the configuration of the force detector according to the fifth embodiment.

FIG. 12 is a sectional view schematically illustrating a configuration of a force detector 1D according to this embodiment. FIG. 13 is an exploded view schematically illustrating the configuration of the force detector 1D according to this embodiment. As illustrated in the drawings, the force detector 1D according to this embodiment includes a recess 3b (a stress generator) that is provided in the support layer 3. On the other hand, in the force detector 1D according to this embodiment, the protrusions 3a are not provided in the support layer 3. That is, in the force detector 1D according to this embodiment, a recess 3b is provided as the stress generator 4.

In the force detector 1D according to this embodiment, the recess 3b provided in the support layer 3 serves as the stress generator 4. That is, the force detector 1D according to this embodiment includes the recess 3b formed in the layer with a relatively large Young's modulus (the support layer 3 side in this embodiment) out of the detection layer 2 and the support layer 3 as the stress generator 4.

A plurality of recesses 3b are arranged in an array shape, for example, at the same positions as the protrusions 3a according to the first embodiment when seen in the normal direction of the detection face M. In this embodiment, for example, the recesses 3b have the same square shape when seen in the normal direction of the detection face M. In this embodiment, the plurality of recesses 3b are arranged at equal spacing in the X direction and the Z direction. The arrangement spacing of the plurality of recesses 3b can change. The plurality of recesses 3b may be arranged at unequal spacing.

In the force detector 1D according to this embodiment, since the recess 3b having a square shape when seen in the normal direction of the detection face M is provided, the magnitude or the direction of a stress applied to the surroundings of the recess 3b changes depending on the direction of the force F acting on the detection face M. In this embodiment, the surroundings of the recess 3b mean surroundings of wall surfaces of the support layer 3 forming the recess 3b and include the inside of the recess 3b.

The shape of the recess 3b when seen in the normal direction of the detection face M is not limited to the square shape. The recess 3b has only to have a shape in which the magnitude or the direction of a stress applied to the surroundings of the recess 3b changes depending on the direction of a force F acting on the detection face M. The shape of the recess 3b when seen in the normal direction of the detection face M may a circle shape. In this embodiment, all the recesses 3b have the same shape, but may include a recesses 3b having another shape.

Four sensors 5 are provided for each recess 3b. The sensors 5 are provided at a position displaced in the +X direction from a center position of the recess 3b, a position displaced in the −X direction from the center position, a position displaced in the +Z direction from the center position, and a position displaced in the −Z direction from the center position such that they surround the center position when seen in the normal direction of the detection face M. As illustrated in FIG. 12, the sensors 5 are disposed in the recess 3b.

The sensors 5 output signals of intensities corresponding to the stress (that is, a strain or a pressure) generated in the detection layer 2. What force F acts on a part of the detection face M located on the −Y side of the recess 3b can be calculated based on the detection values from the four sensors 5 provided for each recess 3b.

In this way, when a force F is applied to the detection face M of the force detector 1D, a strain or a pressure is generated in the layered structure 7. When a force F is applied in the tangential direction of the detection face M, an asymmetric strain distribution is generated around the recess 3b due to pressing of the detection layer 2 against the wall surface of the recess 3b. The strain or the pressure (that is, a stress) around the recess 3b is detected by the sensors 5. The distribution of the strain is inverted by inverting the direction in which the force F is applied. Accordingly, an output difference between two sensors 5 arranged with the center position of the recess 3b interposed therebetween includes information of the direction of the force F and the magnitude of the force F.

On the other hand, when a force in the normal direction with a uniform distribution is applied to the detection face M, the same strain is applied to two sensors 5 arranged with the center position of the recess 3b interposed therebetween. Accordingly, the sum of the outputs of the two sensors 5 includes information of the magnitude of the force F. The magnitude and the direction of the force F applied to the force detector 1D can be calculated based on the difference and the sum of the outputs of the sensors 5.

Sixth Embodiment

A sixth embodiment will be described below with reference to FIGS. 14 and 15. In describing this embodiment, description of the same constituents as in the first embodiment will be omitted or simplified.

Figure 14:
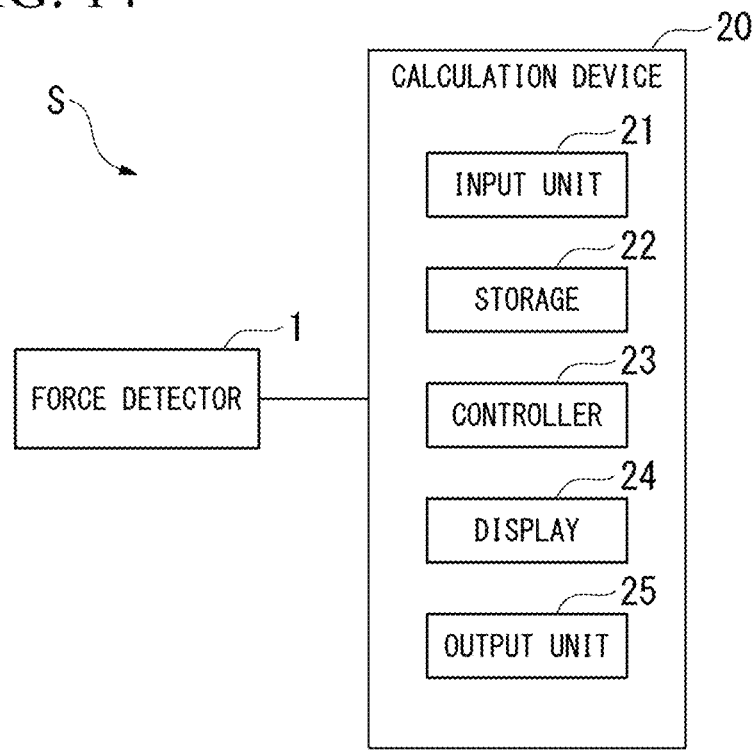
FIG. 14 is a block diagram schematically illustrating a configuration of a force detection system according to a sixth embodiment.

FIG. 14 is a block diagram schematically illustrating a configuration of a force detection system S according to this embodiment. As illustrated in the drawing, the force detection system S according to this embodiment includes the force detector 1 according to the first embodiment and a calculation device 20. The force detection system S may include the force detector 1A according to the second embodiment, the force detector 1B according to the third embodiment, the force detector 1C according to the fourth embodiment, or the force detector 1D according to the fifth embodiment instead of the force detector 1 according to the first embodiment.

The calculation device 20 is constituted by a computer device or a workstation and performs a calculation process based on the output of the force detector 1. As illustrated in FIG. 14, the calculation device 20 includes an input unit 21, a storage 22, a controller 23 (a calculator), a display 24, and an output unit 25.

The input unit 21 includes an input interface that can receive a signal output from the force detector 1 or an operation unit or the like that can receive an operator's command. The input unit 21 is directly connected to the force detector 1 in a wired or wireless manner, and detection values of the sensors 5 in the force detector 1 are input thereto.

The storage 22 is constituted, for example, by a semiconductor memory, a magnetic memory, or an optical memory but is not particularly limited thereto. For example, the storage 22 can also serve as a main storage device, an auxiliary storage device, or a cache memory of a computer device or a workstation. The storage 22 stores arbitrary information that is used for operation of the calculation device 20. For example, the storage 22 can store various types of information such as a system program and an application program.

In this embodiment, the storage 22 stores correction values that are used for the controller 23 to calculate a force F acting on the force detector 1 in advance. An idea of a correction method using the correction values stored in the storage 22 will be described below with reference to FIG. 15. FIG. 15 illustrates a two-dimensional model for describing an idea of a correction method.

Figure 15:
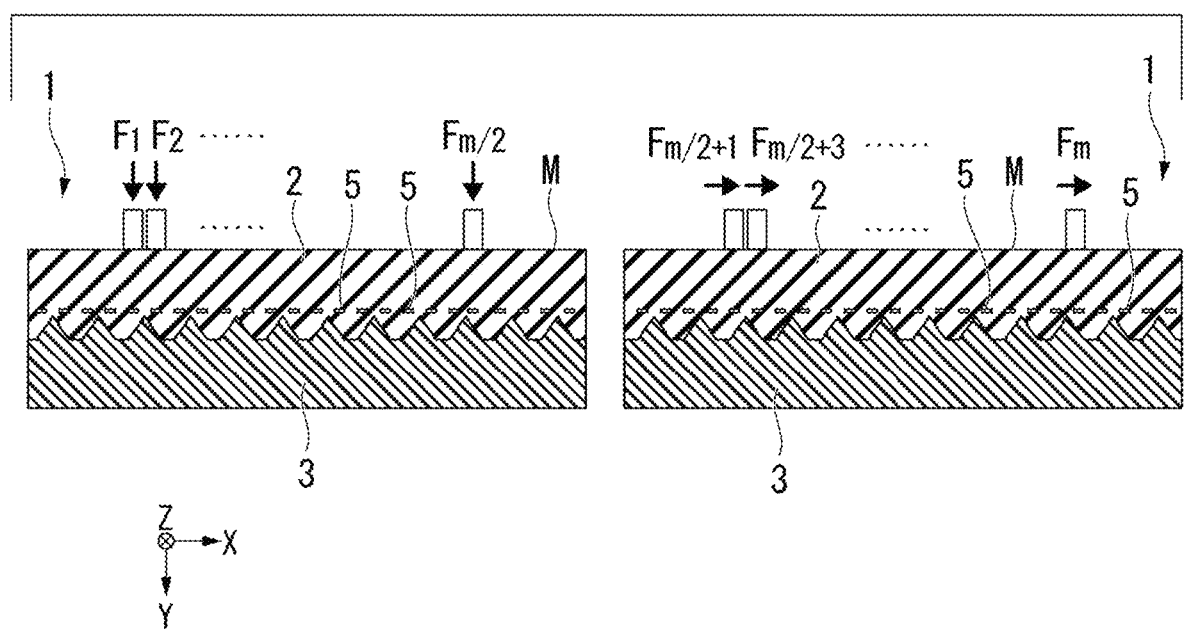
FIG. 15 is a diagram illustrating a two-dimensional model for describing a correction method in the force detection system according to the sixth embodiment.

As illustrated in FIG. 15, a force $F_1$ in the normal direction with a constant magnitude is applied to a certain point of the detection face M of the force detector 1. At this time, detection values $s_{11}, \ldots,$ and $s_{1n}$ of n sensors 5 are recorded as correction values. Subsequently, a position to which a force is applied is shifted a micro distance in the X direction and a force $F_2$ in the normal direction with the same magnitude is applied to the position. Similarly, the detection values $s_{21}, \ldots,$ and $s_{2n}$ of the sensors are recorded as correction values. In this way, correction values up to a force $F_{m/2}$ are recorded while shifting the position. Here, m is an even number.

Then, a force $F_{m/2+1}$ in the X direction is similarly applied to the position at which the force $F_1$ has been applied in the force detector 1 and detection values of the sensors 5 are recorded as correction values. Similarly, a force $F_{m/2+2}$ in the X direction is applied to the position at which the force $F_2$ has been applied in the force detector 1 and detection values of the sensors 5 are recorded as correction values. In this way, correction values of the sensors 5 up to a force $F_m$ are recorded as correction values. Sensor outputs when a force $F_0$ is applied to an arbitrary position are defined as $s_{01}, \ldots,$ and $s_{0n}$. $F_0$ can expressed as Expression (1) using a linear combination of $F_1$ to $F_m$.

$$F_0 = k_1 F_1 + k_2 F_2 + k_3 F_3 + \ldots + k_m F_m \tag{1}$$

Here, a relational expression of coefficients $k_1, \ldots,$ and $k_m$ and correction values $s_{01}, \ldots,$ and $s_{0n}$ can be expressed as Expression (2).

$$\begin{pmatrix} s_{01} \\ s_{02} \\ \vdots \\ s_{0n} \end{pmatrix} = \begin{pmatrix} s_{11} & s_{21} & \cdots & s_{m1} \\ s_{12} & s_{22} & \cdots & \vdots \\ \vdots & \vdots & \ddots & \vdots \\ s_{1n} & \cdots & \cdots & s_{mn} \end{pmatrix} \begin{pmatrix} k_1 \\ k_2 \\ \vdots \\ k_m \end{pmatrix} \tag{2}$$

Here, the coefficients $k_1, \ldots,$ and $k_m$ are calculated as approximate solutions. $F_0$ is calculated by substituting the approximate solutions for Expression (1).

In the actual force detector 1, the protrusions 3a and the sensors 5 are arranged in an array shape in a depth direction (the Z direction), a position to which a force is applied is present in the Z direction by correction, and the Z direction is added to the direction of the force. In this case, the same correction method can be used. The correction method is not limited to this method, but a force may be applied to a specific shape such as a sphere or a rectangle instead of a point in correction and detection values of the sensors 5 at that time may be used as the correction values.

The controller 23 includes at least one processor and at least one dedicated circuit and has, for example, a combination thereof. The processor is a general-purpose processor such as a central processing unit (CPU) or a graphics processing unit (GPU) or a processor dedicated for a specific process. For example, the dedicated circuit is a field-programmable gate array (FPGA) or an application-specific integrated circuit (ASIC). The controller 23 performs processes associated with the operation of the calculation device 20 while controlling the constituents of the calculation device 20.

The controller 23 calculates a value of a force F acting on the force detector 1 based on the correction values stored in the storage 22 and the detection values of the sensors 5 of the force detector 1. At this time, the controller 23 calculates the value of the force F acting on the force detector 1 based on the aforementioned correction method. One or more embodiments are not limited thereto but deep learning or the like may be used as the operational method performed by the controller 23.

The display 24 displays various types of information. The display 24 can employ, for example, a liquid crystal display. Here, the display 24 is not limited to the liquid crystal display and may employ, for example, an organic electroluminescence (EL) display. The output unit 25 serves to output an operation result of the calculation device 20 or the detection values of the force detector 1 to the outside.

With the force detection system S according to this embodiment, the detection values of the force detector 1 are corrected using the correction values acquired in advance according to the characteristics of the force detector 1. Accordingly, it is possible to more accurately calculate the value of a force F acting on the force detector 1.

While exemplary embodiments have been described above with reference to the accompanying drawings, the present invention is not limited to the above embodiments. All shapes, combinations, and the like of the constituents described in the aforementioned embodiments are merely examples and can be modified in various forms based on a design request without departing from the gist.

For example, in one or more embodiments, the configuration in which the Young's modulus of the material of the detection layer 2 is smaller than the Young's modulus of the material of the support layer 3 has been described. However, one or more embodiments of the present invention is not limited to the above configuration. One or more embodiments of the present invention may employ a configuration in which the Young's modulus of the material of the detection layer 2 is larger than the Young's modulus of the material of the support layer 3. When the Young's modulus of the material of the detection layer 2 is larger than the Young's modulus of the material of the support layer 3, one or more embodiments may employ a configuration in which the sensors 5 are disposed by being embedded in the support layer 3.

(1) A force detector according to one or more embodiments may include a first layer and a second layer, the first layer having a detection face that receives a force to be detected, the second layer being provided on a face opposite to the detection face. A Young's modulus of the first layer is different from a Young's modulus of the second layer. The force detector further includes a stress generator formed in the layered structure and configured to receive the force acting in a tangential direction of the detection face and to generate a stress with a distribution which is asymmetric with respect to a normal direction of the detection face around the stress generator. The force detector further includes a plurality of sensors distributed and arranged around the stress generator.

(2) In the force detector according to one or more embodiments, the plurality of sensors is disposed by being embedded inside either the first layer or the second layer, whichever has a smaller Young's modulus.

(3) In the force detector according to one or more embodiments, either the first layer or the second layer, whichever has a smaller Young's modulus, has a protrusion that functions as the stress generator.

(4) In the force detector according to one or more embodiments, either the first layer or the second layer, whichever has a smaller Young's modulus, has a void that functions as the stress generator.

(5) The force detector according to one or more embodiments may further include a force dispersing layer that is stacked on the detection face of the first layer and is formed of a material that has a larger Young's modulus than the first layer.

(6) In the force detector according to one or more embodiments, a force dispersing layer protrusion that protrudes from the force dispersing layer to the first layer functions as the stress generator.

(7) In the force detector according to one or more embodiments, the plurality of sensors is disposed to surround an apex of the protrusion.

(8) In the force detector according to one or more embodiments, either the first layer or the second layer, whichever has a larger Young's modulus, has a recess that functions as the stress generator.

(9) In the force detector according to one or more embodiments, the Young's modulus of the first layer is smaller than the Young's modulus of the second layer, the first layer is a detection layer, and the second layer is a support layer that supports the detection layer.

(10) The force detector according to one or more embodiments may further include wires that are connected to the plurality of sensors and disposed by being embedded in the detection layer.

(11) A force detection system according to one or more embodiments may include the force detector according to (1), and a calculation device configured to perform a calculation process of calculating a value of a force acting on the force detector based on an output of the force detector and a predetermined correction value.

(12) In the force detection system according to one or more embodiments, the plurality of sensors is disposed by being embedded inside either the first layer or the second layer, whichever has a smaller Young's modulus.

(13) In the force detection system according to one or more embodiments, either the first layer or the second layer, whichever has the smaller Young's modulus, has a protrusion that functions as the stress generator.

(14) In the force detection system according to one or more embodiments, either the first layer or the second layer, whichever has the smaller Young's modulus, has a void that functions as the stress generator.

(15) The force detection system according to one or more embodiments may further include a force dispersing layer that is stacked on the detection face of the first layer and is formed of a material that has a larger Young's modulus than the first layer.

(16) In the force detection system according to one or more embodiments, a force dispersing layer protrusion that protrudes from the force dispersing layer to the first layer functions as the stress generator.

(17) In the force detection system according to one or more embodiments, the plurality of sensors is disposed to surround an apex of the protrusion.

(18) In the force detection system according to one or more embodiments, either the first layer or the second layer, whichever has a larger Young's modulus, has a recess that functions as the stress generator.

(19) In the force detection system according to one or more embodiments, the Young's modulus of the first layer is smaller than the Young's modulus of the second layer, the first layer is a detection layer, and the second layer is a support layer that supports the detection layer.

(20) The force detection system according to one or more embodiments may further include wires that are connected to the plurality of sensors and disposed by being embedded in the detection layer.

According to one or more embodiments, the stress generator configured to receive a force acting in the tangential direction of the detection face of the first layer and to generate a stress with a distribution which is asymmetric with respect to the normal direction of the detection face around the stress generator is formed in the layered structure including the first layer and the second layer. Even when there is a small difference in Young's modulus between the first layer and the second layer, it is possible to cause the stress generator to generate a stress with an asymmetric distribution. By detecting the asymmetric stress distribution using a sensor, it is possible to calculate a force acting on the detection face. Accordingly, according to one or more embodiments, it is not necessary to have a pressure transmission member with a very large Young's modulus therein, and it is possible to enhance a reliability and to easily bend it.

As used herein, the following directional terms "front, back, above, downward, right, left, vertical, horizontal, below, transverse, row and column" as well as any other similar directional terms refer to those instructions of a device according to one or more embodiments. Accordingly, these terms, as utilized to describe one or more embodiments should be interpreted relative to a device according to one or more embodiments.

The term "configured" is used to describe a component, unit or part of a device includes hardware and/or software that is constructed and/or programmed to carry out the function.

Moreover, terms that are expressed as "means-plus function" in the claims should include any structure that can be utilized to carry out the function of that part of one or more embodiments.

The term "unit" is used to describe a component, unit or part of a hardware and/or software that is constructed and/or programmed to carry out the function. Typical examples of the hardware may include, but are not limited to, a device and a circuit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A force detector comprising:
   a layered structure comprising:
      a first layer comprising a detection face that receives a force to be detected; and
      a second layer disposed on a face opposite to the detection face;
   a stress generator formed in the layered structure and that:
      receives the force acting in a tangential direction of the detection face; and
      generates a stress with a distribution that is asymmetric with respect to a normal direction of the detection face around the stress generator;
   a plurality of sensors disposed around the stress generator; and
   wires that are connected to the plurality of sensors and that output signals from the plurality of sensors,
   wherein a Young's modulus of the first layer is smaller than a Young's modulus of the second layer,
   wherein a protrusion that protrudes from the second layer to the first layer is provided as the stress generator,
   wherein the plurality of sensors and the wires are embedded inside the first layer, and
   wherein the plurality of sensors and the wires are formed of a material with the same Young's modulus as the first layer.

2. The force detector according to claim 1, wherein the first layer has a void that functions as the stress generator.

3. The force detector according to claim 1, further comprising:
   a force dispersing layer that is stacked on the detection face of the first layer and is formed of a material that has a larger Young's modulus than the first layer.

4. The force detector according to claim 3, wherein a force dispersing layer protrusion that protrudes from the force dispersing layer to the first layer functions as the stress generator.

5. The force detector according to claim 1, wherein the plurality of sensors is disposed to surround an apex of the protrusion.

6. The force detector according to claim 1, wherein the second layer has a recess that functions as the stress generator.

7. The force detector according to claim 1,
   wherein the Young's modulus of the first layer is smaller than the Young's modulus of the second layer,
   wherein the first layer is a detection layer, and
   wherein the second layer is a support layer that supports the detection layer.

8. A force detection system comprising:
   the force detector according to claim 1; and
   a calculation device that performs a calculation process of calculating a value of a force acting on the force detector based on an output of the force detector and a predetermined correction value.

9. The force detection system according to claim 8, wherein the first layer has a void that functions as the stress generator.

10. The force detection system according to claim 8, further comprising:
    a force dispersing layer that is stacked on the detection face of the first layer and is formed of a material that has a larger Young's modulus than the first layer.

11. The force detection system according to claim 10, wherein a force dispersing layer protrusion that protrudes from the force dispersing layer to the first layer functions as the stress generator.

12. The force detection system according to claim 8, wherein the plurality of sensors is disposed to surround an apex of the protrusion.

13. The force detection system according to claim 8, wherein the second layer has a recess that functions as the stress generator.

14. The force detection system according to claim 8,
    wherein the Young's modulus of the first layer is smaller than the Young's modulus of the second layer,
    wherein the first layer is a detection layer, and
    wherein the second layer is a support layer that supports the detection layer.

* * * * *